United States Patent
Massey et al.

(10) Patent No.: US 9,451,377 B2
(45) Date of Patent: Sep. 20, 2016

(54) DEVICE, METHOD AND SOFTWARE FOR MEASURING DISTANCE TO A SOUND GENERATOR BY USING AN AUDIBLE IMPULSE SIGNAL

(71) Applicants: Howard Massey, Poughquag, NY (US); Rob Haack, Scottsdale, AZ (US)

(72) Inventors: Howard Massey, Poughquag, NY (US); Rob Haack, Scottsdale, AZ (US)

(73) Assignee: Howard Massey, PoughQuag, NY (US)

( * ) Notice: Subject to any disclaimer, the term of this patent is extended or adjusted under 35 U.S.C. 154(b) by 78 days.

(21) Appl. No.: 14/539,676

(22) Filed: Nov. 12, 2014

(65) Prior Publication Data
US 2015/0195666 A1    Jul. 9, 2015

Related U.S. Application Data (60) Provisional application No. 61/924,587, filed on Jan. 7, 2014.

(51) Int. Cl.
*H04R 29/00* (2006.01)
*G01S 11/14* (2006.01)

(52) U.S. Cl.
CPC ............ *H04R 29/001* (2013.01); *G01S 11/14* (2013.01); *H04R 29/00* (2013.01); *H04R 29/008* (2013.01)

(58) Field of Classification Search
CPC ... H04R 29/00; H04R 29/008; H04R 29/001
USPC ..................... 381/58–59, 105, 56
See application file for complete search history.

(56) References Cited

U.S. PATENT DOCUMENTS

| | | | |
|---|---|---|---|
| 7,587,053 B1 | 9/2009 | Pereira | |
| 7,676,044 B2 * | 3/2010 | Sasaki | H04S 7/302 381/303 |
| 7,929,720 B2 * | 4/2011 | Ishibashi | H04S 7/302 381/300 |
| 7,933,418 B2 | 4/2011 | Morishima | |
| 8,279,709 B2 | 10/2012 | Choisel et al. | |
| 8,363,851 B2 * | 1/2013 | Suzuki | H04R 1/403 381/300 |
| 2006/0140414 A1 * | 6/2006 | Higashihara | H04R 29/00 381/59 |
| 2008/0226087 A1 * | 9/2008 | Kinghorn | H04S 7/301 381/59 |
| 2011/0222373 A1 | 9/2011 | Lee | |
| 2012/0076306 A1 | 3/2012 | Aarts et al. | |
| 2012/0117502 A1 | 5/2012 | Nguyen et al. | |
| 2012/0127831 A1 | 5/2012 | Gicklhorn et al. | |
| 2013/0024018 A1 | 1/2013 | Chang et al. | |
| 2013/0156207 A1 | 6/2013 | Visser et al. | |
| 2013/0202132 A1 | 8/2013 | Zurek et al. | |
| 2014/0024317 A1 | 1/2014 | Kechichian | |

OTHER PUBLICATIONS http://en.wikipedia.org/wiki/time of arrival.
http://www.symeo.com/English/Technology.
G. Candas, "Setting-up Speakers In A Rectangular Room".

\* cited by examiner

*Primary Examiner* — Disler Paul
(74) *Attorney, Agent, or Firm* — Tannenbaum, Helpern, Syracuse & Hirschtritt LLP; Gerald F. Diebner (57) ABSTRACT

A device method and software for measuring distance to a sound generator, such as a loudspeaker, by using an audible impulse signal is disclosed. This invention provides a significant improvement over past systems for measuring distance with, for example, a smartphone or tablet device, with measurable accuracy within a fraction of an inch, making it suitable for even the most demanding professional applications.

26 Claims, 3 Drawing Sheets

```
Code excerpt:

BOOL click, measuring, measured, calibrate;
double measurement, calibration;

AudioTimer()
{
        static Float64 startTime = 0.0;
        static double rms = 0.0;

RenderInputAudio();

double total = 0.0;
        for( int i=0; i<inNumberFrames; i++ )
        {
                samples[i] = (double)((SInt16*)(ioData->mBuffers->mData))[i] / 32768.0;
                total += samples[i]*samples[i];

if( measuring )
                {
                        if( fabs(samples[i]) > 6.0*rms )
                        {
                                measuring = NO;
                                measured = YES;
                                measurement = inTimeStamp->mSampleTime + i - startTime;
                        }
                }
        }
        rms = sqrt( total / (double)inNumberFrames );

memset( (SInt16*)(ioData->mBuffers->mData), 0, inNumberFrames*2 );

if( click )
        {
                SInt16 *first = &(ioData->mBuffers->mData[0]);
                *first = 32700;
                click = NO;
                measuring = YES;
                startTime = inTimeStamp->mSampleTime;
        }
}

UITimer()
{
        if( measured )
        {
                if( calibrate )
                {
                        calibration = measurement;
                        calibrate = NO;
                } double feet = (measurement-calibration)*(1126.0/44100.0);
                measured = NO;
        }
}

Calibrate()
{
        calibrate = YES;
        click = YES;
        measureButton.enabled = YES;
}

Measure()
{
        click = YES;
}
```

DEVICE, METHOD AND SOFTWARE FOR MEASURING DISTANCE TO A SOUND GENERATOR BY USING AN AUDIBLE IMPULSE SIGNAL

This application claims priority from provisional application 61/924,587 filed Jan. 7, 2014.

BACKGROUND OF THE INVENTION

In any listening environment, knowing the precise distance from a sound generator, such as a loudspeaker, to a listening position, as well as the precise distance between sound generators, and from each sound generator to a boundary wall behind it, is required for setting up the sound generators in such a way as to ensure optimal sound quality. However, software means for measuring the distance between an apparatus such as a smartphone or tablet device and a sound generator can currently only be accomplished through the use of software that does internal calculations based upon either visual surveying or a sonar signal, and both of those techniques are inaccurate and lack the precision required.

Past software systems were capable of only calculating the rough measurement of distance from a smartphone or tablet device to a sound generator, such as a loudspeaker, within a tolerance of several inches to several feet, which is insufficient accuracy when determining proper alignment of audio setups in home, studio or live performance environments. This software provides a significant improvement over past systems, with measurable accuracy within a fraction of an inch, making it suitable for calibrating audio setups with fine precision.

Time of Arrival (ToA or TOA), also known as Time of Flight (ToF) is another measurement technique which measures the travel time of a radio signal from a single transmitter to a single receiver. See for example http://en.wikipedia.org/wiki/Time of arrival and http://www.symeo.com/English/Technology/, both of which are incorporated herein by reference in their entirety. ToA or ToF is different from the present invention because that technology, for example, relies on radio waves whereas the present invention, as described more fully below, relies on audible impulse signals.

This invention provides a significant improvement over past systems for measuring distance with, for example, a smartphone or tablet device, with measurable accuracy within a fraction of an inch, making it suitable for even the most demanding professional applications.

OBJECTS OF THE INVENTION

It is an object of the invention to provide a more precise device and method for measuring the distance between a sound generator, such as a loudspeaker, and a listening position.

It is a further object of the invention to provide a more precise device and method for measuring the distance between sound generators, such as loudspeakers.

It is another further object of the invention to provide a more precise device and method for measuring the distance between a sound generator, such as a loudspeaker, and a boundary wall.

It is a yet further object of this invention to more accurately measure the time of flight of a sound from a sound generator, such as a loudspeaker, to a listening position, another sound generator, or a boundary wall, by accounting for system latency.

These and other objects of the invention are described more fully below.

BRIEF SUMMARY OF INVENTION

Distance between, for example, a loudspeaker and a preferably portable electronic device such as, for example, a smartphone or tablet device, is measured by playing a test signal through the device's audio output and subsequently measuring the round-trip time until the signal is detected at the device's audio input.

An initial calibration measurement is taken at zero distance to account for varying audio system latency.

For a distance measurement, the round trip time is measured in audio samples. The calibration measurement, also in samples, is subtracted from the distance measurement, and the difference is presumed to be the amount of time taken for the acoustic wave emanating from the loudspeaker to reach the device's microphone.

In one preferred embodiment, the system is implemented on a mobile computing device such as a tablet or smartphone which contains a built-in audio output (headphone jack), and an audio input (on-board microphone). Software simultaneously captures audio from the microphone and provides an audio signal to be amplified and routed to the loudspeaker under measurement. At rest, the system outputs audio silence. Two buttons are presented to the user: Calibrate and Measure. The Measure button is disabled until the calibration measurement has been completed.

A distance measurement is taken when the user presses either the Calibrate or Measure button. A large value is inserted into a single sample in the otherwise silent output sample train, creating a click. On the input audio side, the software continually calculates an overall average signal level, representing the "noise floor" of the current audio environment. In order to detect the click in the returning input audio, the software continually monitors the input audio samples looking for a sample with input amplitude above the noise floor by some pre-set amount.

Time difference in audio samples is converted to distance in feet by multiplying the sample delay by the distance traveled by an acoustic wave in air in a single sample period (feet per second divided by samples per second):

$$feet = (measurement - calibration) \times (1126.0 / 44100.0)$$

DESCRIPTION OF DRAWINGS

FIG. 1 shows the states of the inventive apparatus progressing in time. "Click", "Measuring" and "Measure" are binary signals, and "Output Samples" and "Input Samples" are analog signals. The "Click" shows when the inventive apparatus sends a command to the sound generator to emit an impulse signal via the audio output. "Measuring" shows the inventive apparatus measuring the time from when the audio output of the inventive apparatus sends a command to the sound generator to emit an impulse signal to when the audio input of the inventive apparatus detects the impulse signal emitted from the sound generator. "Measured" shows that once the impulse signal is detected by the audio input, the inventive apparatus is no longer measuring time. "Output Samples"

shows that the audio output does not issue a command until it commands the sound generator to emit an impulse signal, shown by the large bar. "Input Samples" shows the sound detected by the audio input. Background noise is below the threshold, while the impulse signal detected by the audio input exceeds the threshold. The arrow shows the time between the audio output commanding the sound generator to emit an impulse signal and when the impulse signal is detected by the audio input. It is the same time as shown in "Measuring."

FIG. 2 is a flow chart showing one embodiment of the invention. It is a flow of audio processing for a block of audio samples and shows periodic software function. After "Begin", the processing flows to "Obtain Input Audio Samples" and "Calculate RMS Noise Floor" (RMS means Root Mean Square). Next, the flow chart questions whether the inventive apparatus is measuring? If Yes, then is any sample above the threshold (as shown for example in FIG. 1)? if the answer is Yes, then distance is measured as Sample Time—Start Time (Sample Time minus Start Time). If the answer to "Measuring?" or "Any Sample Above Threshold?" is No, then the processing flows to "User Pressed Click?" If Yes, the processing flows to "Output Click" and "End". If No, the processing flows to "Output Silence" and then "End". Once "End" is reached, the process returns to "Begin" and repeats the above process. The inventive apparatus is continually sampling while the software is running, i.e., recording audio at a constant rate which can be measured in samples per second. The inventive apparatus is continually processing a "block" of samples in one repetition of the flow chart. In general, the measurement process is not dependent on audio sample rate or number of audio samples processed at once. Rather, the flow chart gets repeated for each arbitrary sized block of input audio samples. Where, for example, the inventive apparatus is an iPhone programmed with the program of FIG. 3, the sampling is repeated about 172 times per second, once for each "block" of 256 audio samples, and therefore the inventive apparatus is sampling audio at 44,100 samples per second.

DETAILED DESCRIPTION OF THE INVENTION

As stated above, in any listening environment, knowing the precise distance from each sound generator, such as a loudspeaker, to the listening position, as well as the precise distance between sound generators, and from each sound generator to a boundary wall behind them, is required for setting up the sound generators in such a way as to ensure optimal sound quality. However, software means for measuring the distance between, for example, a smartphone or tablet device and a sound generator can currently only be accomplished through the use of software that does internal calculations based upon either through visual surveying or the use of a sonar signal, and both of those techniques are inaccurate and lack the precision required. The invention claimed here solves this problem.

By utilizing an impulse signal (a single-wave transient) and internal calculations to determine the round-trip time from a device (smartphone or tablet) generating that signal to a sound generator reproducing that signal (with provision for measuring and adjusting for system latency), this software enables the distance between the device and the sound generator to be measured with a great deal of accuracy.

The claimed invention differs from what currently exists. Previously, smartphone or tablet owners had to rely on software tools incapable of measuring the distance from their device to a sound generator with any significant accuracy. This software fills that void by allowing precise measurement of that distance to be taken.

Other software systems that previously existed were not directed to the identification of accurate distance between sound generators and the listening position, or the distance from a sound generator to a boundary wall behind it, or the distance between sound generators. Using such systems, then, was an inexact, jury-rigged process that resulted in improperly calibrated audio setups, leading to reduced sound quality.

This invention provides a significant improvement over past software systems for measuring distance with, for example, a smartphone or tablet device, with measurable accuracy within a fraction of an inch, making it suitable for even the most demanding professional applications in home theater, home studio, professional recording studio and live sound environments.

EXAMPLE

The following describes one embodiment of the present invention.

A. Components

Figure 3:
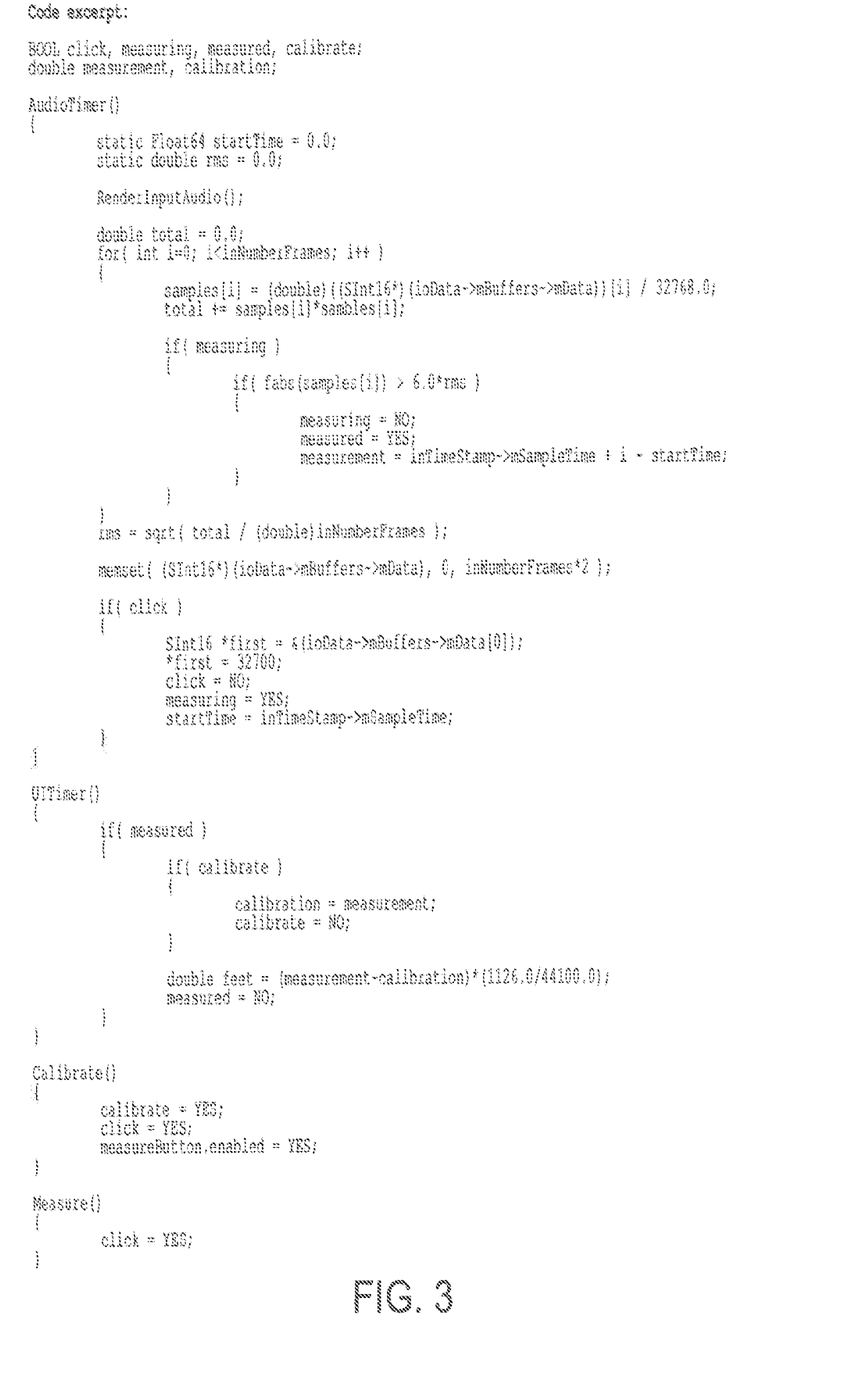
FIG. 3 is the operation and general content of a computer program listing for one embodiment of the invention using an Apple iPhone.

In one embodiment, the components of the present invention include an audio amplifier, a loudspeaker, a smartphone or tablet (the "device") with a built-in microphone for audio input and a built-in headphone output for audio output, a physical cable connecting the headphone (audio output) of the device to the input of the amplifier driving the loudspeaker to be measured and a subject computer-readable medium (the "software app") such as the programming shown in FIG. 3.

B. Relationship Between the Components:

The audio amplifier is connected to the loudspeaker and adjusted to a moderate listening volume, (Note: in so-called "self-powered" loudspeakers, the amplifier is integrated within the unit itself, with this connection made internally.) The software app is installed onto the device. The audio output of the device is connected to the loudspeaker using the connecting cable and is physically placed on top of or directly in front of the loudspeaker.

At the direction of the user, the software app sends an impulse signal to the loudspeaker via the audio output of the device. The microphone built-in to the device picks up the resultant audio generated by the loudspeaker. The time delay between signal propagation and return is then internally measured and stored and displayed as "system latency" (the amount of delay propagated by any electronic and/or mechanical components in the audio amplifier, loudspeaker, device, connecting cable and/or microprocessor in the device doing the internal calculations at the direction of the software app).

Figure 1:
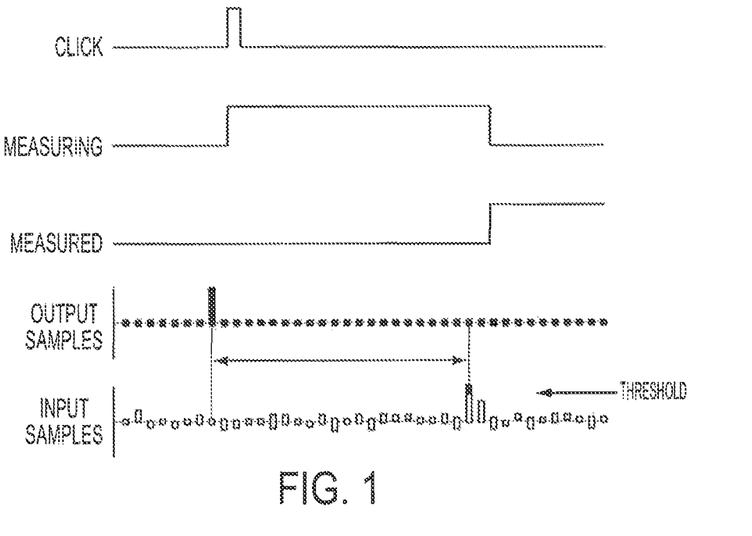
FIG. 1 is an illustration of one embodiment measurement timing, showing how an impulse signal exceeds a threshold (e.g., the audio environment).

The device is then physically moved to the listening position, and the user then causes the software app to generate another impulse signal. The microphone built-in to the device picks up the resultant audio generated by the loudspeaker, and the time delay between signal propagation and return is internally measured and stored. The software app being run by the device can, as shown in FIG. 1, discount for background noise. Spurious readings can be reduced by automatically performing a quick series of measurements and then culling outliers, applying majority logic and/or averaging. The software app then subtracts the "system latency" value to give a precise delay time. This precise delay time is then internally calculated against the known speed of sound to derive an exact distance measurement between the device and the loudspeaker under test.

Figure 4:
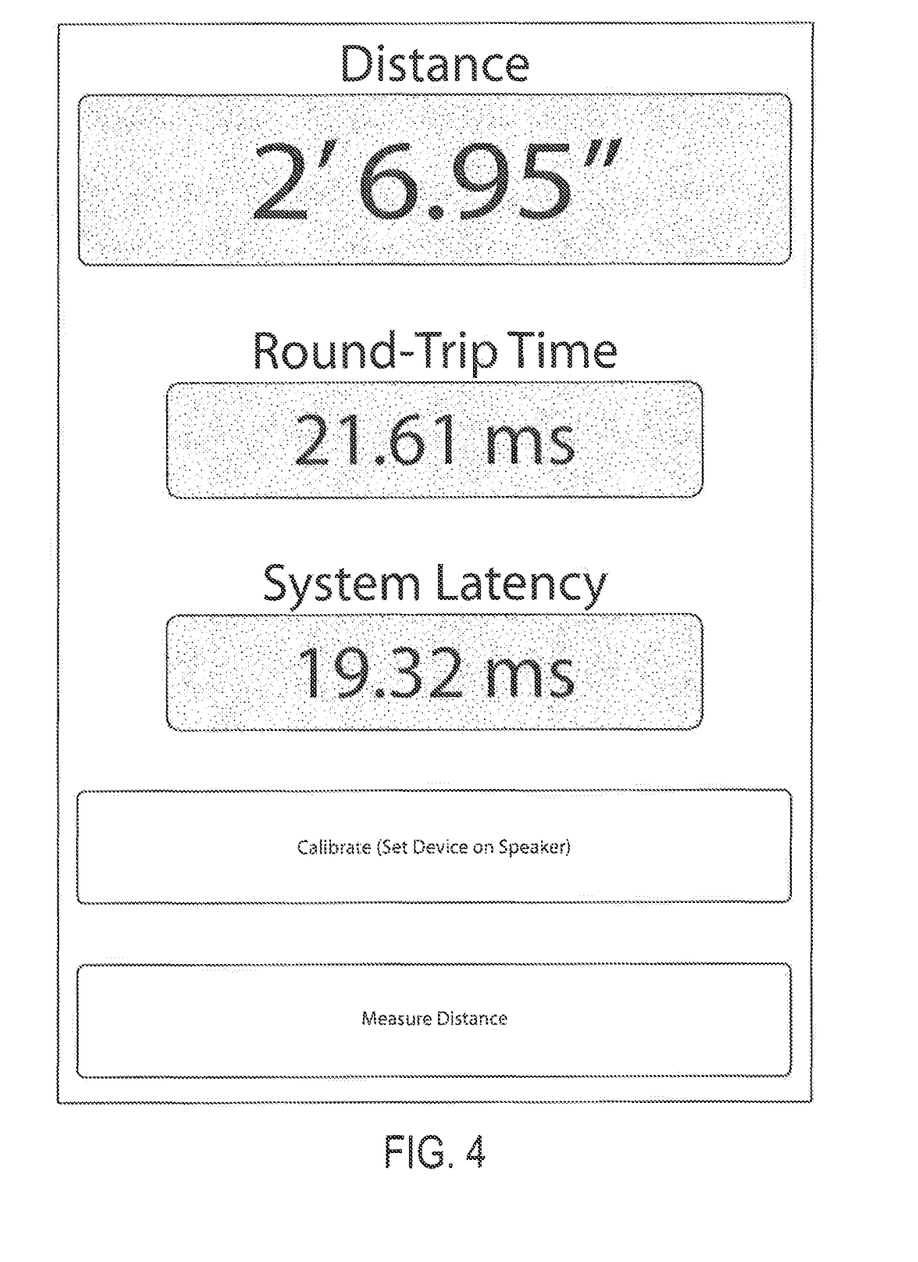
FIG. 4 is an illustration of how distance is calculated by measuring round trip time, deducting system latency time and deriving the distance from the sound generator. As shown in this example, the Round-Trip Time is 21.61 ms and the system latency is 19.32 ms. Deducting system latency from Round-Trip Time and multiplying the result by the speed of sound yields a distance of 2 feet, 6.95 inches.

Once "system latency" is calculated and established, the device can be instead moved to another listening position, or to another loudspeaker, or to a boundary wall behind the loudspeaker under test in order to precisely calculate the distance from a loudspeaker to different listening positions, or from one loudspeaker to another loudspeaker, or from a loudspeaker to a boundary wall behind it. FIG. 4 is a screenshot of the display of one embodiment of the invention showing the distance calculated.

The physical cable connecting the headphone (audio) output of the device to the input of the amplifier driving the loudspeaker to be measured can be replaced with a wireless connection such as WiFi, Bluetooth or other such wireless protocol. In such a case, the "system latency" stored and displayed by the software app would also include any delays caused by the transmission and reception of such wireless signal.

C. How the Invention Works

The software (one embodiment of which is shown in FIG. 3) measures the distance between a loudspeaker and the device (smartphone or tablet) into which the software is loaded. It does this by first directing the user to make a wired or wireless connection between the audio (headphone) output of the device and the audio amplifier driving the loudspeaker under test and to then physically place the device on top of or directly in front of the loudspeaker under test. At the instruction of the user, it then generates an impulse signal and routes the signal to the device's audio (headphone) output so that the impulse signal can be reproduced by the loudspeaker under test. It then measures the time delay between signal propagation and reception by the device's built-in microphone and stores and optionally displays the result as "system latency" for that particular system (the amount of delay propagated by any electronic and/or mechanical components in the audio amplifier, loudspeaker, smartphone/tablet device, connecting cables or wireless transmission/reception system, and/or microprocessor doing the internal calculations at the direction of the software). The software then directs the user to physically move the device to the listening position (or to another listening position, another loudspeaker, or a boundary wall behind the loudspeaker under test). At the instruction of the user, the software once again generates an impulse signal and routes the signal to the device's audio (headphone) output so that the impulse signal can be reproduced by the loudspeaker under test. It then measures the time delay between signal propagation and reception by the device's built-in microphone. The software then subtracts the "system latency" value to arrive at a precise delay time, which is then internally calculated against the known speed of sound to derive an exact distance measurement between the device and the loudspeaker under test. This distance measurement is then stored and displayed in decimal or metric form. The device (for example, a smartphone or tablet) acts as the central hub for this activity, generating the impulse signal through its audio (headphone) output and then receiving the reproduction of that same signal by the loudspeaker through the device's microphone input, allowing the device to interact with the software. Through use of tactile controls (on-screen "buttons"), the user can stop and start these measurements as desired in order to determine the exact distance between the device and loudspeaker under test, thus enabling precise calibration of the audio setup.

Once all connections are made and the device into which the software is loaded is physically placed on top of or directly in front of the loudspeaker, the user must personally choose to have the software send an impulse signal out of the device's audio (headphone) output. If the amplifier receiving this signal does not deliver a loud enough signal to the connected loudspeaker sufficient for use by the software, the software can display an error message prompting the user to increase the gain of the audio system. When a sufficiently loud signal is received, the software must internally measure and calculate the time delay between signal propagation and return and then store and display that value (in milliseconds) as "system latency" (the amount of delay propagated by any electronic and/or mechanical components in the audio amplifier, loudspeaker, smartphone/tablet device, connecting cables or wireless transmission/reception system, and/or microprocessor doing the internal calculations at the direction of the software).

After the device into which the software is loaded is physically moved to the listening position (or to another listening position, another loudspeaker, or the boundary wall behind the loudspeaker under test), the user must personally choose to have the software generate another impulse signal and send it to the device's audio (headphone) output. If the amplifier receiving this signal does not deliver a loud enough signal to the connected loudspeaker sufficient for use by the software, the software can display an error message prompting the user to increase the gain of the audio system. When a sufficiently loud signal is received, the software must internally calculate the time delay between signal propagation and return and then subtract the "system latency" value to arrive at a precise delay time, which must then be internally calculated against the known speed of sound to derive an exact distance measurement between the device and the loudspeaker under test. That distance measurement may then be stored and displayed.

D. To Make the Invention

To make this invention, one must craft software that is able to complete the requisite tasks and provide the user with the useful tool described here above. One example of software to use is shown in FIG. 3.

In a preferred embodiment, all elements are used. Even greater precision of the distance measurement can be obtained by allowing user input (or automatic detection) of room temperature and relative humidity, since the speed of sound varies slightly depending upon these two factors. However, in the absence of such input, the assumption of a temperate climate (both in terms of room temperature and relative humidity) does not significantly impact on the precision of the distance measurement.

Because the distance from loudspeakers to the listening position (as well as the distance between loudspeakers and from each loudspeaker to a boundary wall behind it) is often used in home theaters, home studios, and professional recording studios to ascertain optimal speaker angling ("toe-in") amounts, the invention can be improved by adding internal calculations that serve to recommend the optimum toe-in angle (or range of angles) given the specific measured distances of the audio playback ("monitoring") system under test. It is the inventor's intent to implement such improvement in future revisions of the invention.

Also, because the distance from sound sources to various listening positions is often used in live performance environments to ascertain optimal time alignment of added loudspeakers ("fill speakers," "fill clusters" or "delay towers") through the use of digital delays, the invention can be improved by adding internal calculations that serve to recommend the optimum delay time (or range of delay times) for such additional loudspeakers given the specific measured distances of the sound reinforcement system under test. It is the inventor's intent to implement such improvement in future revisions of the invention.

In addition, because taking a single measurement can sometimes result in spurious readings, the invention can be improved by instead automatically performing a quick series of measurements and then culling outliers, applying majority logic and/or averaging, thus improving accuracy.

Furthermore, the connection between the audio (headphone) output of the device to the input of the amplifier(s) driving the loudspeaker(s) under test does not necessarily have to be a physical cable; signal can instead be directed to the amplifier(s) driving the loudspeaker(s) by means of a wireless connection such as WiFi, Bluetooth or other such wireless protocol.

The elements, can be reconfigured to have the software installed on devices other than smartphones and tablets, and to measure the distance between such device and any component (other than or in addition to a loudspeaker) capable of generating an audible sound.

E. How to Use the Invention

Figure 2:
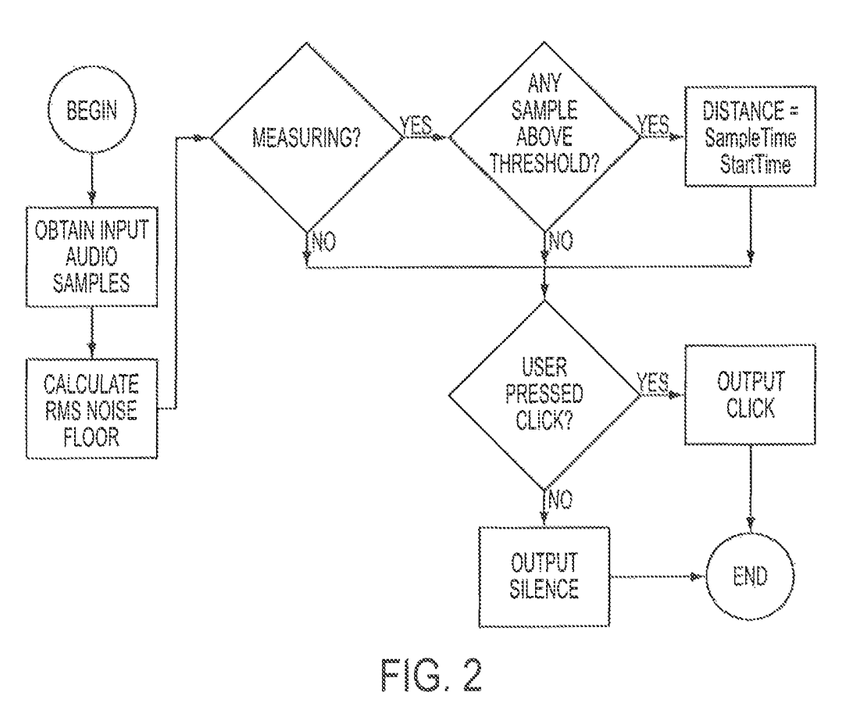

One embodiment of the present invention is shown in the flow chart at FIG. 2. The user first makes a wired or wireless connection between the audio (headphone) output of the smartphone or tablet ("device") into which the software is loaded and the audio amplifier driving the loudspeaker under test. The user then physically places the device on top of or directly in front of the loudspeaker under test and then touches an onscreen button causing the software to generate an impulse signal and route the signal to the device's audio (headphone) output so that the impulse signal can be reproduced by the loudspeaker under test. After the software displays the resulting "system latency time" (derived by calculating the difference in time between signal propagation and reception from the device's built-in microphone), the user then physically moves the device to the listening position (or to another listening position, another loudspeaker, or a boundary wall behind the loudspeaker under test) and touches an onscreen button causing the software to generate an impulse signal and route the signal to the device's audio (headphone) output so that the impulse signal can be reproduced by the loudspeaker under test. After the software calculates and displays the precise distance between the device and loudspeaker under test (accomplished by measuring the time delay between impulse signal propagation and reception from the device's built-in microphone, then subtracting the "system latency" value and then calculating that delay against the known speed of sound), the user then has the option to re-test or to store the value.

By allowing the user to cause the software to generate an impulse signal and measure the time delay between signal propagation and reception from the device's built-in microphone and then calculate that delay against the known speed of sound, the user is uniquely placed to determine the precise distance between the device and the loudspeaker under test and thus correctly align the audio system.

Additionally, this invention can be performed by a computer or machine and can be applied to any field of technology requiring accurate measurement of distance between such computer or machine and another device capable of generating an audible signal.

A number of references discuss the proper placement of loudspeakers and listening position in a room. One reference is G. Cardas, "Setting-up Speakers in A Rectangular Room", which is incorporated herein by reference in its entirety. For example, in Diagram A, in a rectangular room the distance between the center of a woofer face and a side wall should be room width×0.276 and the distance between the center of a woofer face and a wall behind the speaker should be room width×0.447. To obtain the optimal listening position, the distance between the woofer faces of two speakers are measured. An equilateral triangle is then found, with the center of the two woofer faces being two ends of the triangle and the listening positions being the third end (with the speakers facing the listener), as shown in Diagram B. Room width, placement of the loudspeakers from side and back walls, and optimal listening position, can be accurately determined using the present invention.

In the embodiment shown above, the sound generator is a loudspeaker. The invention is not, however, limited to loudspeakers only. By way of non-limiting examples, the sound generator can be a public address system, a bullhorn, a whistle, or an alarm. With, for example, the whistle or alarm, the sound it makes is sufficient to distinguish it from background noise or the audio environment that this sound can be used as the impulse signal.

The present invention can also be used to measure multiple distances from a sound generator. Here, the inventive apparatus is moved to other positions, and a measurement is taken at each new position. Because the same sound generator is used, system latency remains constant, thus requiring that only one measurement be taken at each new point in order to determine distance.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

What is claimed is:

1. An apparatus for measuring a distance between a sound generator and a point remote from the sound generator comprising a computing device with a processor, an audio output and an audio input, wherein the apparatus:
   a. commands the audio output to cause the sound generator to emit a first impulse signal when the computing device is placed next to the sound generator;
   b. measures the time from the command to emit a first impulse signal to the time the first impulse signal is detected by the audio input;
   c. stores said first impulse signal time with the computing device;
   d. commands the audio output to cause the sound generator to emit a second impulse signal when the computing device is placed at a point remote from the sound generator;
   e. measures the time from the command to emit the second impulse signal to the time the second impulse signal is detected by the audio input and store said second impulse signal with the computing device; and
   f. transforms the impulse signals to distance via computer processor programming which retrieves the first and second impulse signal times, deducts the first impulse signal time from the second impulse signal time and multiplies the result by the speed of sound.

2. The apparatus of claim 1, wherein the sound generator is a loudspeaker.

3. The apparatus of claim 1, wherein the distance between the sound generator to the point remote from the sound generator is displayed on a display screen.

4. The apparatus of claim 1, wherein the point remote from the sound generator is a listening position.

5. The apparatus of claim 1, wherein the point remote from the sound generator is a second sound generator.

6. The apparatus of claim 1, wherein the point remote from the sound generator is a boundary wall.

7. The apparatus of claim 1, wherein the computing device processor is programmed to measure the distance to a second point remote from the sound generator where:
 a. the apparatus is placed at the second remote point;
 b. the audio output is commanded to cause the sound generator to emit a third impulse signal;
 c. the time from the command to emit the third impulse signal to the time the third impulse signal is detected by the audio input is measured and stored with the computing device; and
 d. the impulse signals are transformed to distance via computer processor programming which retrieves the first and third impulse signal times, deducts the first impulse signal time from the third impulse signal time and multiplies the result by the speed of sound.

8. The apparatus of claim 1, wherein the apparatus can distinguish the impulse signal from the apparatus' audio environment.

9. The apparatus of claim 1, wherein the audio output of the apparatus communicates with the sound generator via a cable.

10. The apparatus of claim 1, wherein the apparatus communicates with the sound generator via a wireless connection.

11. The apparatus of claim wherein the computing device is a smartphone or a tablet.

12. A method for measuring a distance between a sound generator and a point remote from the sound generator using a computing device with a processor, an audio output and an audio input, comprising:
 a. commanding the audio output to cause the sound generator to emit a first impulse signal when the computing device is placed next to the sound generator;
 b. measuring the time from the command to emit a first impulse signal to the time the first impulse signal is detected by the audio input;
 c. storing said first impulse signal time with the computing device;
 d. commanding the audio output to cause the sound generator to emit a second impulse signal when the computing device is placed at a point remote from the sound generator;
 e. measuring the time from the command to emit the second impulse signal to the time the second impulse signal is detected by the audio input and storing said second impulse signal with the computing device; and
 f. transforming the impulse signals to distance via computer processor programming which retrieves the first and second impulse signal times, deducts the first impulse signal time from the second impulse signal time and multiplies the result by the speed of sound.

13. The method of claim 12, wherein the sound generator is a loudspeaker.

14. The method of claim 12, wherein the distance between the sound generator to the point remote from the sound generator is displayed on a display screen.

15. The method of claim 12, wherein the point remote from the sound generator is a listening position.

16. The method of claim 12, wherein the point remote from the sound generator is a second sound generator.

17. The method of claim 12, wherein the point remote from the sound generator is a boundary wall.

18. The method of claim 12, for further measuring a distance to a second point remote from the sound generator comprising:
 a. placing the apparatus at the second remote point;
 b. commanding the audio output to cause the sound generator to emit a third impulse signal;
 c. measuring the time from the command to emit the third impulse signal to the time the third impulse signal is detected by the audio input and storing said measurement with the computing device; and
 d. transforming the impulse signals to distance via computer processor programming which retrieves the first and third impulse signal times, deducts the first impulse signal time from the third impulse signal time and multiplies the result by the speed of sound.

19. The method of claim 12, wherein the apparatus can distinguish the impulse signal from the apparatus' audio environment.

20. The method of claim 12, wherein the audio output of the apparatus communicates with the sound generator via a cable.

21. The method of claim 12, wherein the apparatus communicates with the sound generator via a wireless connection.

22. The method of claim 12 wherein the computing device is a smartphone or a tablet.

23. An apparatus for measuring a distance between a loudspeaker and a point remote from the loudspeaker comprising a portable computing device with a processor, an audio output, an audio input and a display screen, wherein the apparatus:
 a. commands the audio output to cause the loudspeaker to emit a first impulse signal when the computing device is placed next to the loudspeaker;
 b. measures the time from the command to emit a first impulse signal to the time the first impulse signal is detected by the audio input;
 c. stores said first impulse signal time with the computing device;
 d. commands the audio output to cause the loudspeaker to emit a second impulse signal when the computing device is placed at a point remote from the loudspeaker;
 e. measures the time from the command to emit the second impulse signal to the time the second impulse signal is detected by the audio input and storing said second impulse signal with the computing device;
 f. transforms the impulse signals to distance via computer processor programming which retrieves the first and second impulse signal times, deducts the first impulse signal time from the second impulse signal time and multiplies the result by the speed of sound; and
 g. displays the distance so measured on the display screen.

24. The apparatus of claim 23 wherein the portable computing device is a smartphone or a tablet.

25. A method for measuring a distance between a loudspeaker and a point remote from the loudspeaker using a portable computing device with a processor, an audio output, an audio input and a display screen, comprising:

a. commanding the audio output to cause the loudspeaker to emit a first impulse signal when the computing device is placed next to the loudspeaker;
b. measuring the time from the command to emit a first impulse signal to the time the first impulse signal is detected by the audio input;
c. storing said first impulse signal time with the computing device;
d. commanding the audio output to cause the loudspeaker to emit a second impulse signal when the computing device is placed at a point remote from the loudspeaker;
e. measuring the time from the command to emit the second impulse signal to the time the second impulse signal is detected by the audio input and storing said second impulse signal with the computing device;
f. transforming the impulse signals to distance via computer processor programming which retrieves the first and second impulse signal times, deducts the first impulse signal time from the second impulse signal time and multiplies the result by the speed of sound; and
g. displaying the distance so measured on the display screen.

26. The method of claim 25, wherein the portable computing device is a smartphone or a tablet.

* * * * *

UNITED STATES PATENT AND TRADEMARK OFFICE
CERTIFICATE OF CORRECTION

PATENT NO. : 9,451,377 B2  
APPLICATION NO. : 14/539676  
DATED : September 20, 2016  
INVENTOR(S) : Howard Massey and Rob Haack Page 1 of 1

It is certified that error appears in the above-identified patent and that said Letters Patent is hereby corrected as shown below:

In the Claims

In Column 9 of the patent, at Claim 11, after "claim" and before "wherein", please insert --1--.

Signed and Sealed this  
Third Day of January, 2017

Michelle K. Lee  
*Director of the United States Patent and Trademark Office*